Dec. 16, 1969    N. N. CAPALIA    3,484,025
CONTAINER HAVING MEASURING MEANS
Filed June 24, 1968    2 Sheets-Sheet 1

INVENTOR.
NICK N. CAPALIA
BY Fulwider, Patton, Rieber,
Lee and Utecht
ATTORNEYS

Dec. 16, 1969　　　　N. N. CAPALIA　　　3,484,025
CONTAINER HAVING MEASURING MEANS
Filed June 24, 1968　　　　　　　　　　2 Sheets-Sheet 2
FIG. 6
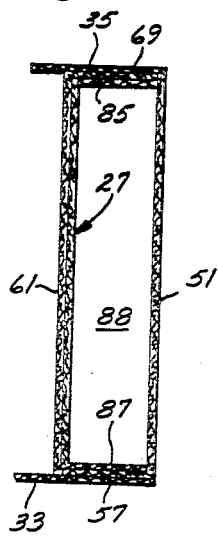
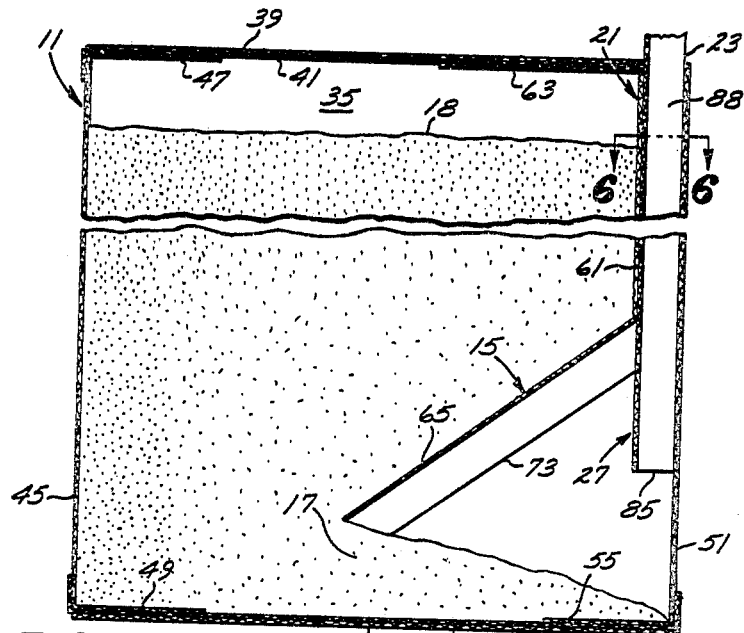
FIG. 5
FIG. 8
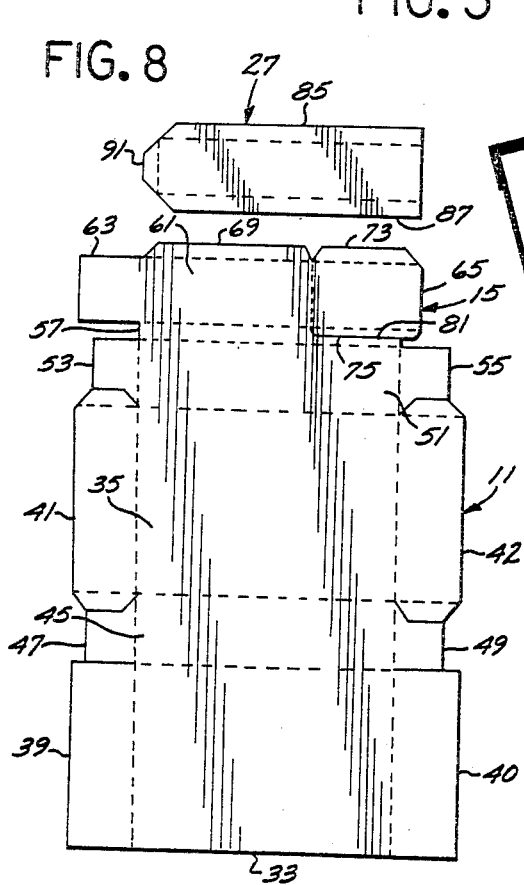
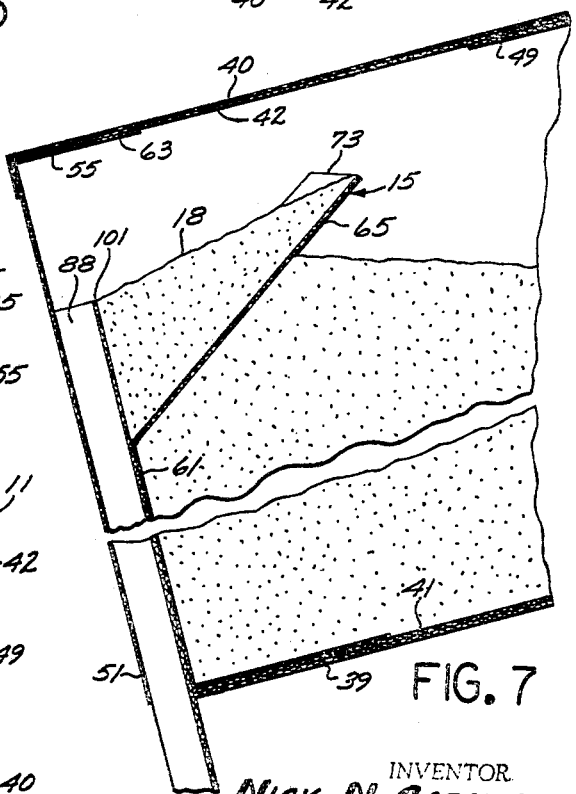
FIG. 7
INVENTOR.
NICK N. CAPALIA
BY Fulwider, Patton, Rieber,
Lee and Utecht
ATTORNEYS United States Patent Office 3,484,025
Patented Dec. 16, 1969

3,484,025
CONTAINER HAVING MEASURING MEANS
Nick N. Capalia, San Pedro, Calif., assignor of one-half to Allan R. Ide, Long Beach, Calif.
Filed June 24, 1968, Ser. No. 739,379
Int. Cl. G01f 11/26
U.S. Cl. 222—456                4 Claims

ABSTRACT OF THE DISCLOSURE

A container including a hopper disposed in the lower portion thereof, such hopper being formed with an inlet to admit a predetermined quantity of a flowable material when said container is positioned upright. A chute extends from the top of the hopper to an outlet in the top of the container and receives a slidable measuring tab which cooperates with the walls of the container to define a passageway from the hopper to the outlet, the measuring tab normally projecting into the hopper and blocking communication of the material from the hopper to said passageway. The measuring tab may be retracted from the hopper in selected increments to permit measured quantities of said material to spill from the hopper into the passageway and out said opening when the container is inverted.

BACKGROUND OF THE INVENTION

Field of the invention

The present invention relates to containers which includes means for dispensing measured quantities of material (as for example a powdered soap or detergent) therefrom.

DESCRIPTION OF PRIOR ART

Presently known containers which dispense measured quantities of material are generally complex in construction and expensive to manufacture. Containers have been proposed which include closed bottom hoppers disposed in the upper portion of the container for collecting a measured amount of material while the container is being returned from its upright position thereby readying such measured amount of material for dispensation the next time the container is overturned. A container of this type is shown in U.S. Patent No. 2,799,436. Such containers do not perform satisfactorily because a separate hopper must be provided for each individual measure, or cumulative measure, of material to be dispensed. Further, when the material in the container is nearly exhausted, the hoppers are only partially filled each time the container is inverted, thus giving inaccurate measurements.

SUMMARY OF THE INVENTION

The container of present invention is characterized by a hopper disposed in the lower portion thereof and including an inlet to permit a predetermined amount of material to flow thereinto when said container is positioned upright. A chute forms a passageway from the top of the hopper to an outlet in the top of the container whereby when the container is inverted the predetermined amount of material previously admitted to the hopper will be collected therein and passed out the passageway to the outlet.

An object of the present invention is to provide a container including means for conveniently dispensing measures of flowable material.

Another object of the present invention is to provide a container of the type described that can be conveniently adjusted to dispense any measured portion of a predetermined quantity of such material.

Still another object of the present invention is to provide a container of the type described that is inexpensive to manufacture and can be readily assembled by conventional box-forming mechanisms.

Other objects and features of the invention will become apparent from consideration of the following description taken in connection with the accompanying drawings.

BRIEF DESCRIPTION OF THE DRAWINGS

FIG. 5 is a broken vertical sectional view, in enlarged scale, taken along the lines 5—5 of FIG. 3;

FIG. 6 is a horizontal sectional view in enlarged scale, taken along the lines 6—6 of FIG. 5;

FIG. 7 is a broken vertical sectional view similar to FIG. 5 but showing the container in inverted position; and FIG. 8 is a plan view of a cardboard pattern from which the container shown in FIG. 1 may be made.

DESCRIPTION OF THE PREFERRED EMBODIMENT

Figure 1:
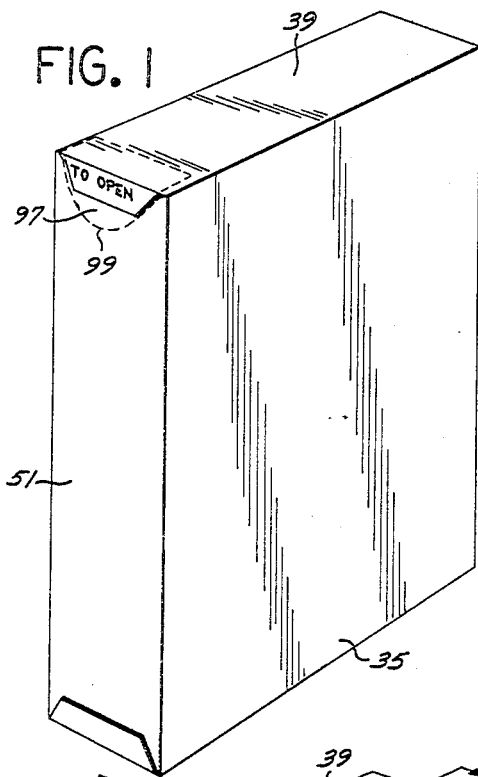
FIG. 1 is a perspective view of a container embodying the present invention.

Referring to FIG. 5, the container of present invention preferably includes a carton, generally designated 11, having an open bottom hopper generally designated 15 disposed in the lower portion thereof and spaced from the bottom wall to form an inlet 17 which admits flowable material 18 contained in the box when the box is in its upright position, as shown in FIG. 5. A chute, generally designated 21, extends from the top of the hopper 15 to an outlet 23 in the top of the carton 11 and a measuring tab generally designated 27, is slidable therein and normally projects into the hopper 15. Thus, the measuring tab 27 can be adjusted to project selected distances into the hopper 15 and the carton 11 inverted to the position shown in FIG. 7 thereby causing material which has been previously admitted to the hopper to collect therein and a measured portion thereof, depending on the position of the tab 27, will spill over the upper end of the tab 27 and pass out the outlet 23.

The carton 11 is particularly useful in dispensing powdered soap and may be made from a cardboard blank (FIG. 8) including front and back walls 35 and 37 respectively, having respective top and bottom flaps 39 and 40, and 41 and 42, respectively. Interposed between the front and back walls 33 and 35 is a side wall 45 having top and bottom flaps 47 and 49 respectively. Arranged for disposition opposite the side wall 45 is another side wall 51 having top and bottom flaps 53 and 55. It is noted that the side wall 51 forms one wall of the chute 21 and arranged therebeside is a second wall 57 with a third wall 61 attached thereto for disposition opposite the wall 51. The wall 61 includes a top flap 63 and the lower portion thereof forms an angled wall 65 (FIG. 5) forming one wall of the hopper 15. Referring to FIGS. 6 and 8, a marginal edge 69 of the wall 61 is bent perpendicular to such wall and adhered to the back wall 35 to form the closure defining the chute 21. Still referring to FIG. 8, the hopper wall 65 includes a pair of opposed marginal edges 73 and 75 which are bent perpendicular to the plane of the wall 65 for adherence to the back and front walls 35 and 33, respectively. It is noted that the marginal edge 75 is cut from the chute wall 57 and that the adjacent remaining portion 81 of such wall will, when the carton 11 is formed, remain in the plane of the wall 57 and cooperate therewith to form a surface extending the entire height of the container to which the overlapping marginal edge (FIG. 6) of the front wall 33 can be adhered to.

Figure 2:
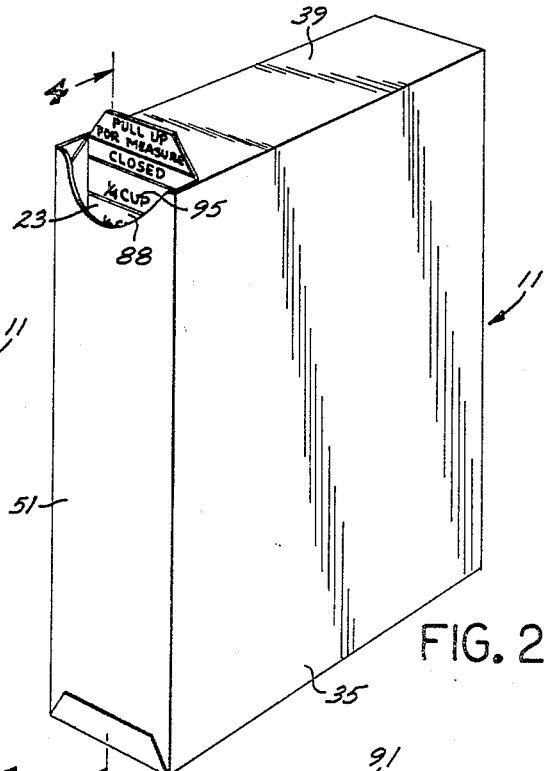
FIGS. 2 and 3 are perspective views similar to FIG. 1 showing the operation of the measuring tab of said container.
Figure 3:
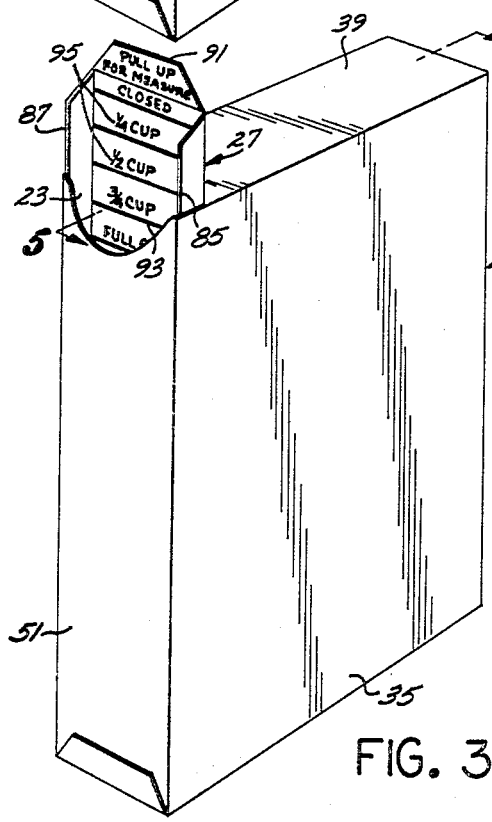
Figure 4:
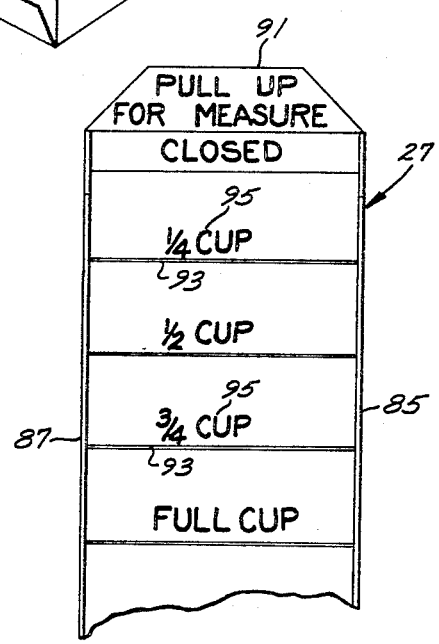
FIG. 4 is a partial vertical sectional view in enlarged scale, taken along the lines 4—4 of FIG. 2.

With continued reference to FIG. 8, the measuring tab 27 is formed from a piece of flat cardboard having a pair of longitudinal creases therein to enable bending of opposed marginal edges and to form walls 85 and 87 which are equal in width to the width of the chute 21 thereby maintaining the tab guided throughout its travel in the chute and cooperating with the walls of the carton 11 to define a soap-receiving passageway 88. The upper end of the tab 27 is tapered on its opposite edges and is creased horizontally to form a finger grasp tab 91. Referring to FIGS. 2, 3 and 4, the tab 27 includes a plurality of vertically spaced horizontal measuring marks 93 which have indicia 95 disposed adjacent thereto for indicating the amount of soap which will be dispensed with any particular setting of such tab.

In operation, when the carton 11 is to be opened, the user presses the opening push-out 97 (FIG. 1) to initiate tearing along a perforated line 99 and the entire push-out 97 is removed. The finger grasp portion 91 is then accessible and may be grasped to extend the measuring tab 27. When the soap is to be dispensed from the carton 11 the tab 27 is projected until the mark 93 corresponding with the amount of soap desired registers with the top of the carton 11. The carton is then inverted and the soap which had previously flowed in the hopper inlet 17 will fall downwardly within the hopper 15 and be collected therein. A portion, depending on the setting of the measuring tab 27, of the soap so collected in the hopper 15 will spill over the upper end 101 of the tab 27, pass downwardly in the passageway 88 and out the outlet 23.

When the carton 11 is to be stored, the measuring tab 27 may be retracted fully within the carton 11 with its lower end 101 abutting the bottom wall of such carton thereby blocking any additional soap from passing out the passageway 88 to the outlet 23.

It should be noted that the container of present invention could be utilized without the measuring tab 27 and the hopper 15 sized to dispense the desired quantity of soap each time the carton 11 is upturned. Also, the measuring tab 27 could be utilized without the chute 21 to cooperate with the container walls to form the passageway 88 between the hopper 15 and the opening 23.

From the foregoing it will be apparent that the container of present invention provides for convenient dispensation of measured quantities of flowable material, even to substantially the last portions remaining in such container. Also, the measuring tab in such container provides for precise adjustment throughout the range of the hopper capacity for dispensation of any portion of the entire quantity collected in such hopper.

Various modifications and changes may be made with regard to the foregoing description without departing from the spirit of the invention.

I claim:
1. A container for dispensing measured amounts of a flowable material, said container comprising:
  a carton including an outlet in its upper portion;
  a hopper disposed in the lower portion of said carton and having a downwardly and inwardly inclined wall which terminates in a lower edge spaced a selected distance from the bottom wall of said carton and cooperating therewith to define an inlet for admitting a predetermined quantity of said flowable material to said hopper when said container is in its upright position, said hopper further being formed with an opening in its upper portion; and
  a chute extending from said hopper opening to said outlet and cooperating with the walls of said carton to form a material-receiving passageway whereby when said carton is overturned, said predetermined quantity of material will be collected in said hopper, passed through said passageway, and out said outlet.

2. A container as set forth in claim 1 that includes:
  an elongated measuring tab extending slidably into said chute and formed with a wall disposed adjacent the inner wall of said chute, and projectable selected distances into said hopper to block portions of said measured quantity of material from flowing from said hopper when said carton is overturned thereby permitting selected amounts of said material to spill over the upper end thereof and out said chute.

3. A container as set forth in claim 1 wherein:
  said carton is formed from a blank which is folded to form front and back walls and a pair of end walls, one of said end walls forming a first wall for said chute, and said blank being folded inwardly at one side of said first wall to project inwardly and form a second wall and then being folded to project coextensive with said first wall to form a third wall of said chute whereby said chute and carton may be formed integrally.

4. A container as set forth in claim 3 wherein:
  the lower portion of said third wall forms said downwardly and inwardly inclined wall of said hopper.

References Cited

UNITED STATES PATENTS

| | | | |
|---|---|---|---|
| 907,291 | 12/1908 | Sanders | 222—456 X |
| 2,309,234 | 1/1943 | Bonander | 222—456 |
| 2,335,363 | 11/1943 | Shelton | 222—456 X |
| 2,692,708 | 10/1954 | Frey | 222—456 |

STANLEY H. TOLLBERG, Primary Examiner